(12) United States Patent
Savo et al.

(10) Patent No.: US 6,316,926 B1
(45) Date of Patent: Nov. 13, 2001

(54) SWITCHING CONTROL CIRCUIT

(75) Inventors: Alessandro Savo; Salvatore Portaluri; Pierandrea Savo, all of Pavia; Giuseppe Luciano, Brugherio, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/575,334

(22) Filed: May 19, 2000

(51) Int. Cl.$^7$ ............................................... G05F 1/40
(52) U.S. Cl. ..................... 323/282; 323/283; 323/284; 323/901
(58) Field of Search ............................. 323/282, 283, 323/284, 265, 901, 285

(56) References Cited

U.S. PATENT DOCUMENTS

| | | | |
|---|---|---|---|
| 4,791,544 | * 12/1988 | Gautherin et al. | 363/49 |
| 5,912,551 | * 6/1999 | Corsi et al. | 323/283 |
| 5,917,313 | * 6/1999 | Callahan | 323/288 |
| 6,094,039 | * 7/2000 | Farrenkopf | 323/283 |

* cited by examiner

Primary Examiner—Peter S. Wong
Assistant Examiner—Gary L. Laxton
(74) Attorney, Agent, or Firm—E. Russell Tarleton; Seed IP Law Group PLLC

(57) ABSTRACT

A switching regulator having a switching element, a control loop for varying a duty cycle of the switching element according to a difference between a switching regulator output electric quantity and a target output electric quantity, and a digital soft start-up circuit for digitally controlling the duty cycle of the switching element, independently from said difference, in a start-up phase of the switching regulator operation.

19 Claims, 4 Drawing Sheets

SWITCHING CONTROL CIRCUIT

TECHNICAL FIELD

The present invention relates to the field of DC power supplies. More specifically, the invention concerns DC-DC switching power supplies or converters, such as switching voltage regulators, particularly but not exclusively for the generation of a regulated DC negative voltage starting from a DC positive voltage. Still more particularly, the invention relates to a pulsewidth-modulated (PWM) converter.

BACKGROUND OF THE INVENTION

The field of switching regulators is quite broad and includes every electronic circuit that performs a conversion of electric energy using a switching technique (hereinafter "converters").

In principle, the operation of switching regulators is based on the storage of electric energy by a reactive element. Periodically, with a given frequency, a fraction of the energy stored in the reactive element is transferred to a further reactive element, which in turn furnishes the electric energy stored therein to a load.

Switching regulators belong to two large families: AC-DC switching regulators, and DC-DC switching regulators. DC-DC switching regulators are typically used in applications comprised of several electronic sub-systems, requiring different supply voltages, with only a single DC voltage supply externally available. Thus, the different supply voltages are to be obtained starting from such single available DC voltage supply.

Generally, switching regulators include a control loop: an output electric quantity (output voltage or current) is monitored and compared to a reference quantity, corresponding to a target value for the output quantity. Depending on the "error", i.e., the difference between the monitored output quantity and the reference quantity, the frequency and/or duty cycle of opening/closing of a switching element are varied.

FIG. 1 depicts a schematic block diagram of a known DC-DC switching regulator, particularly a flyback switching regulator for generating a regulated DC negative voltage starting from a DC positive voltage. The regulator comprises a switching element 1, for example a P-channel MOS transistor, connected between a DC positive voltage Vin and a first terminal 2 of a first reactive element, namely an inductor L; the second terminal of the inductor L is connected to a reference voltage, namely the ground. The first terminal 2 of the inductor L is connected to a cathode of a diode D whose anode is connected to a first terminal 3 of a second reactive element, namely a first plate of a capacitor C; the second plate of capacitor C is connected to ground. An output terminal Vout of the regulator is connected to the first plate 3 of capacitor C. A feedback network 4 senses the voltage at the output terminal Vout and provides a corresponding signal 5 to an error amplifier 6. The error amplifier 6 comprises an operational amplifier 7, having an inverting input supplied with the signal 5 and a non-inverting input supplied with a reference voltage Vbg, for example generated by a band-gap reference voltage generator, not shown in the drawing. A compensation network 8 is connected in negative feedback to the operational amplifier 7. An output signal 9 of the error signal amplifier 6 is supplied to a positive input of a comparator 10; a negative input of the comparator 10 is supplied with a triangular signal 11 generated by a triangular signal generator 12. An output signal 13 of comparator 10 drives the switching element 1.

The described switching regulator is capable of providing, at the output terminal Vout thereof, a regulated DC negative voltage starting from the DC positive voltage Vin. The output voltage Vout is continuously monitored by the feedback network; the error amplifier 6 compares the output voltage Vout to the reference voltage Vbg and provides an error signal 9 proportional to the error, i.e., the difference between the output voltage Vout and the reference voltage Vbg. The comparator 10 and the triangular signal generator 12 form an error-to-duty cycle converter that converts the error signal 9 into a variable duty cycle of a periodic square wave, driving the switching element 1.

In operation, the output voltage Vout, after an initial, start-up transient following the regulator power-up during which the capacitor C is progressively charged, reaches a steady state value.

A problem affects the shown switching regulator, and more generally any PWM switching regulator that works in a control loop converting the error signal into a variable duty cycle of the driving signal for the switching element 1. The problem is that at the beginning of the start-up transient the error amplifier 6 is unbalanced, due to the fact that the output capacitor C is completely discharged. Therefore, the switching element 1 is kept almost always on, with a consequent electrical over-stress. This may cause the burning up, or at least the damage of the switching element.

This problem has already been addressed in the art. A so-called "soft start-up" capability has been provided to control the duty cycle of the switching element at the start-up of the switching regulator, in order not to destroy the switching element due to an excessive current.

The known solutions for implementing such a soft start-up capability are based on analog techniques that provide for applying a ramp voltage to the input or the output of the error amplifier.

The main problem with such techniques is the poor control of the activation time of the switching element due to the limited bandwidth of both the error amplifier and the error-to-duty cycle converter. As a consequence, the current flowing through the switching element is poorly controlled.

Another problem with the known technique is that, in order to achieve the desired long soft start-up times, relatively large capacitors are to be used for the generation of the ramp voltage. Such capacitors, due to their substantial dimensions, cannot be integrated on the same semiconductor chip where the switching regulator is integrated and must be provided as external components. This is obviously disadvantageous, at least because it imposes the provision of a dedicated pad for the connection of an external capacitor.

SUMMARY OF THE INVENTION

In view of the state of the art described, the disclosed embodiments of the present invention provide a switching regulator with soft start-up capability, which however is not affected by the above-identified disadvantages.

An embodiment of the present invention includes a switching regulator comprising a switching element, a control loop for varying a duty cycle of the switching element according to a difference between a switching regulator output electric quantity and a target output electric quantity, and a digital soft start-up circuit for digitally controlling the duty cycle of the switching element, independently from said difference, in a start-up phase of the switching regulator operation.

BRIEF DESCRIPTION OF THE DRAWINGS

The features and advantages of the present invention will be made apparent by the following detailed description of two preferred practical embodiments thereof, illustrated by way of non-limiting examples in the annexed drawings, wherein.

DETAILED DESCRIPTION OF THE PREFERRED EMBODIMENTS

Figure 1:
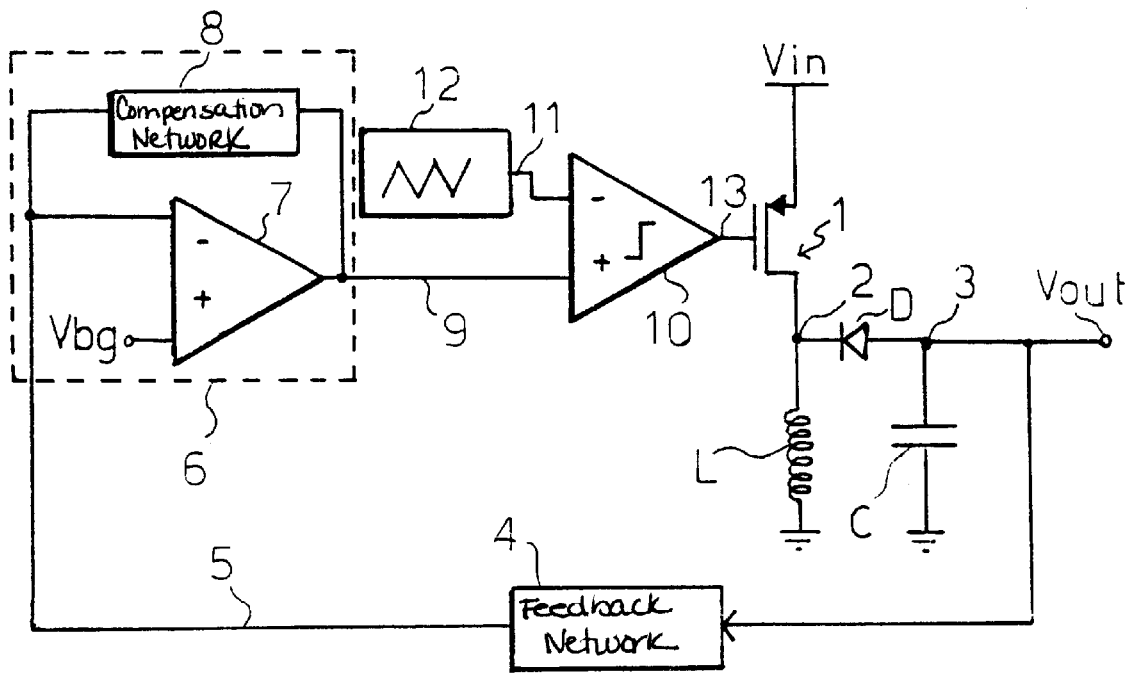
FIG. 1 shows a schematic block diagram of a switching regulator according to the prior art.
Figure 2:
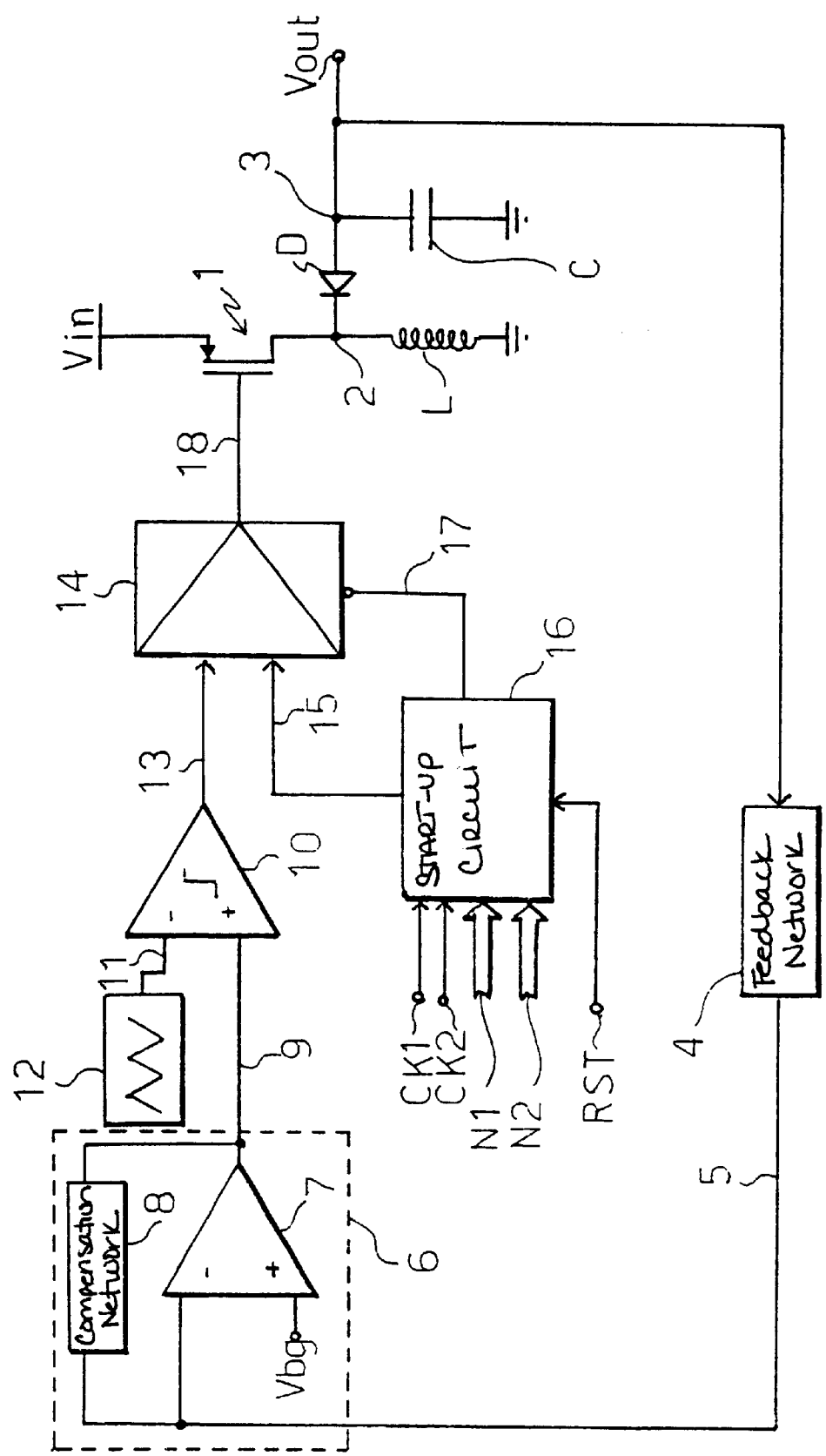
FIG. 2 shows a schematic block diagram of a switching regulator according to a first practical embodiment of the present invention.

Referring to FIG. 2, a first practical embodiment of the present invention will be now described. Elements identical or equivalent to those appearing in FIG. 1 will be identified by same reference numerals.

Compared to the known structure depicted in FIG. 1, the switching regulator according to the first practical embodiment of the invention further includes a multiplexer 14 receiving, at a first input thereof, the output signal 13 of comparator 10. A second input of the multiplexer 14 receives a signal 15 generated by a digital soft start-up circuit, schematized as a block and identified as 16. Multiplexer 14 is controlled by a multiplexer control signal 17, also generated by the digital soft start-up circuit 16, so as to commute a multiplexer output signal 18 onto either signal 13, outputted by comparator 10, or signal 15, generated by the digital soft start-up circuit 16. The output signal 18 from multiplexer 14 drives the switching element 1.

The digital soft start-up circuit 16 receives as inputs a reset signal RST, activated at the start-up of the switching regulator, a first and a second clock signals CK1, CK2 of significantly different respective frequencies, and a first and a second bundles of digital signals N1, N2, carrying a first and a second digital code, respectively.

The switching regulator of FIG. 2 behaves in the following way.

The two clock signals CK1, CK2 are periodic signals having respective frequencies that differ substantially from each other, the frequency of signal CK2 being for example three orders of magnitude higher than the frequency of signal CK1. Suitable frequency values are for example 500 KHz for signal CK1, and 16 MHz for signal CK2. As it will become apparent later on, signal CK1 determines the switching period of the switching element 1 in the start-up phase. Signal CK2 is used to vary the duty cycle of signal 15, that is, to vary the duty cycle of the switching element 1 in the start-up phase; the higher the frequency of clock signal CK2 compared to the frequency of clock signal CK1, the more precise the control on the duty cycle of the switching element 1 during the start-up transient. Clearly, the two clock signals CK1, CK2 can be generated starting from a single clock signal; for example, clock signal CK1 can be generated starting from clock signal CK2 by means of a divider circuit.

Reset signal RST is a signal which is activated upon starting up of the switching regulator. For example, reset signal RST is a pulse, for example produced by any conventional power-on reset circuitry upon powering-up of the switching regulator or of the electronic circuit incorporating the switching regulator.

Activation of reset signal RST causes the multiplexer control signal 17 to be activated, so that the output 18 of multiplexer 14 is commuted onto signal 15. In this way, in the start-up phase the control loop of the switching regulator is open, and the output signal 13 of the error-to-duty cycle converter does not affect the behavior of the switching element 1.

Through signals N1 and N2 two numeric values, digitally coded, n1 and n2, are supplied to the digital soft start-up circuit 16. These digital codes defines on one hand the overall duration of the start-up phase, the latter being defined by the relation:

$$(T_{CK1} * n1) * n2$$

where $T_{CK1}$ is the period of clock signal CK1.

The multiplexer control signal 17 is kept activated for the whole start-up phase. During this phase, a square-wave periodic signal is put on signal 15, with a period equal to the period $T_{CK1}$ of clock signal CK1. The duty cycle of such a periodic signal is controlled by the digital soft start-up circuit independently from the output voltage Vout of the switching regulator, in the following way. For the first n1 periods of clock signal CK1, the duty cycle of the square wave signal put on signal 15 is set equal to $T_{CK2}/T_{CK1}$, where $T_{CK2}$ is the period of clock signal CK2. For the following n1 periods of clock signal CK1, the duty cycle of the square wave signal is augmented and set equal to $2*(T_{CK2}/T_{CK1})$. This procedure is iterated a number n2 of times, augmenting the duty cycle of the square wave signal of an amount equal to $T_{CK2}/T_{CK1}$ every n1 periods $T_{CK1}$. In the last n1 periods, the duty cycle of the square wave signal is set equal to $n2*(T_{CK2}/T_{CK1})$. Then, the multiplexer control signal 17 is deactivated, the multiplexer output 18 is commuted onto signal 13 and the control loop of the switching regulator is closed. From this time on, the switching regulator behaves in the conventional way, the output voltage Vout being controlled by the control loop.

By selecting proper values n1, n2 to be placed on signals N1, N2, it is possible to select the desired duration of the start-up phase.

Figure 3:
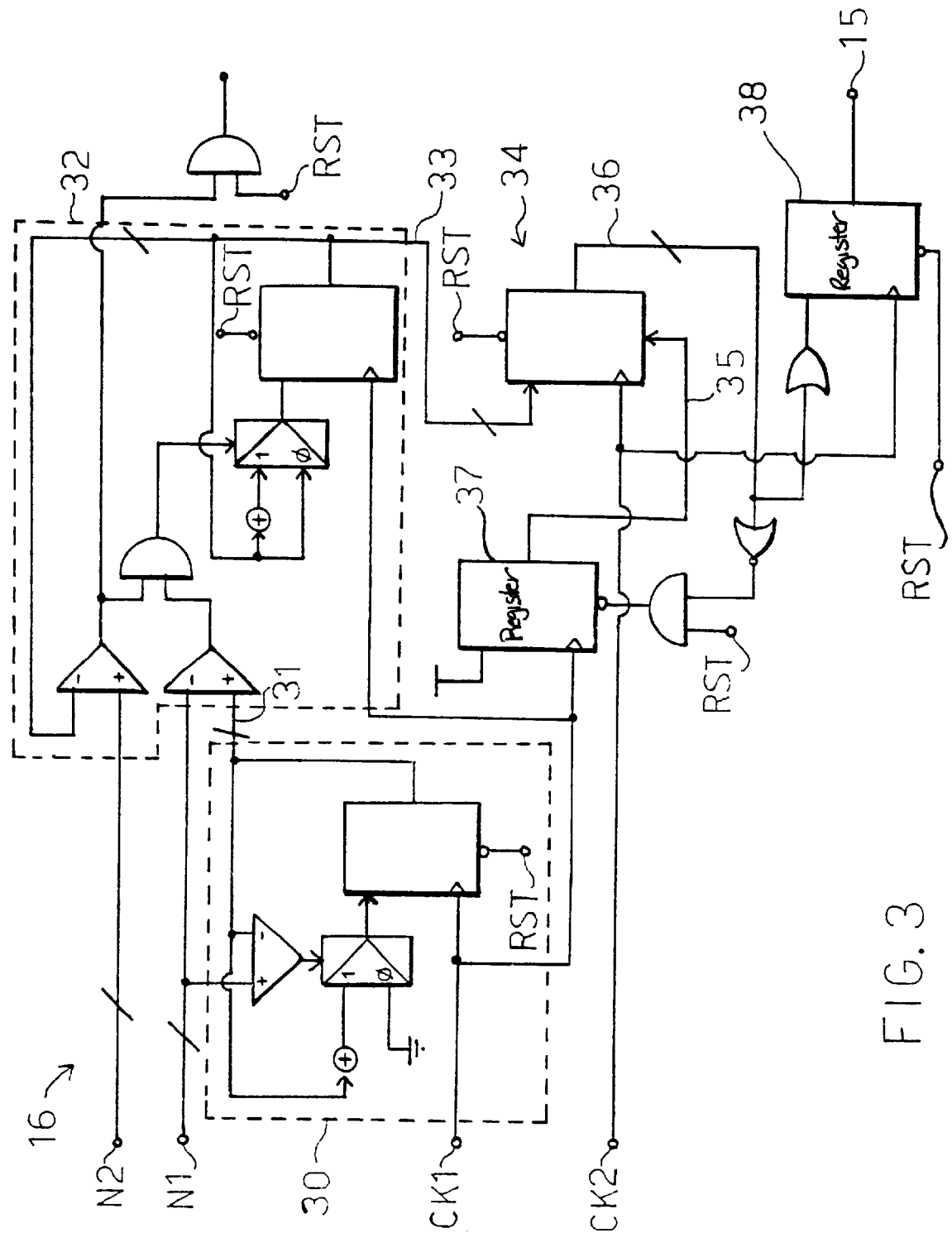
FIG. 3 is an exploded block diagram of one functional block in the switching regulator of FIG. 2.

A possible implementation of the soft-start digital circuit block 16 is depicted in FIG. 3, and will be now discussed.

Signals N1 are supplied to a first conditioned incrementer 30, clocked by clock signal CK1 (of lower frequency). The first conditioned incrementer 30 has an output 31 (a bundle of digital signals). Upon activation of the reset signal RST, the numeric value at the output of the incrementer 30 is set to zero. Then, the output of the incrementer 30 is augmented by a unity every period of clock signal CK1 until the output 31 reaches, after n1 periods $T_{CK1}$ of clock signal CK1, the value n1 carried by signals N1, thereby returning to zero.

Signals N1, N2 and the output 31 of the first conditioned incrementer 30 are supplied to a second conditioned incrementer 32, clocked again by clock signal CK1. The second conditioned incrementer 32 has an output 33 (a bundle of digital signals). Upon activation of the reset signal RST, the output 33 of the second conditioned incrementer 32 is set to a numeric value of one Then, as long as the value at the output 33 of the second incrementer 32 is lower than the value n2 carried by signals N2, each time the value at the output 31 of the first incrementer 30 reaches the value n1 carried by signals N1 (i.e., every n1 periods $T_{CK1}$ of clock signal CK1) the value at the output 33 is augmented by one every period of clock signal CK1.

The output 33 of the second conditioned incrementer 32 is supplied to a down counter 34, clocked by clock signal CK2 (of higher frequency). The value carried by the output 33 of the second conditioned incrementer 32 is used as a pre-load value for the down counter 34, such a pre-load value being loaded into the down counter 34 upon activation of a pre-load enable signal 35. Upon activation of the reset signal RST, the content of the down counter 34 is set to zero. Then, upon activation of the pre-load enable signal 35, the value carried by the output 33 of the second conditioned counter 32 is loaded into the down counter 34; the latter then counts down, i.e., decrements its content, every period $TCK_2$ of clock signal CK2.

The down counter 34 has an output 36 (a bundle of digital signals). The pre-load enable signal 35 is provided by a register 37, clocked by clock signal CK1. The pre-load enable signal 35 is activated, synchronously with clock signal CK1, upon activation of reset signal RST or when the value at the output 36 of the down counter 34 equals zero.

Signal 15, driving the switching element 1 during the start-up phase, is furnished by a register 38 clocked by clock signal CK2. The logic level of signal 15 is the logic OR of the signals in the bundle of signals 36 at the output of the down counter. In other words, signal 15 stays at the "1" logic level as long as the down counter 34 has not completed the count down; this means that the time of permanence at the "1" logic level of signal 15 depends on the value which is loaded into the down counter 34.

Signal 17 is activated upon activation of the reset signal PST, and remains activated as long as the value at the output 33 of the second conditioned incrementer 32 is lower than the value n2 carried by signals N2. In this way, signal 17 remains activated for the whole start-up phase to open the switching regulator control loop.

Figure 5:
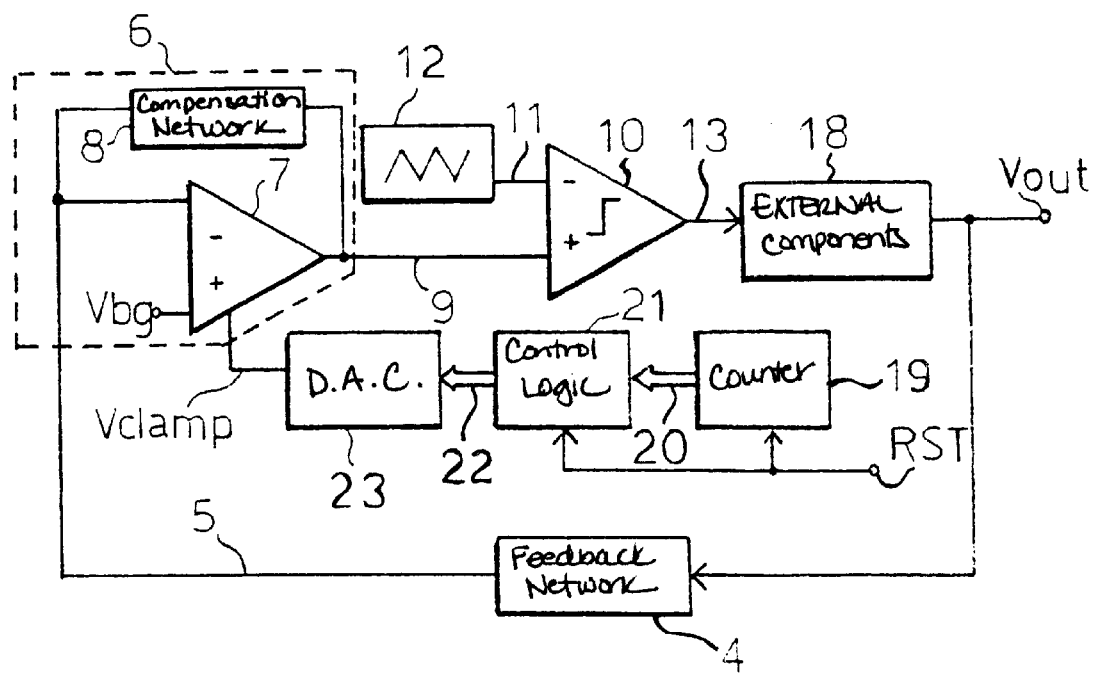
FIG. 5 is a schematic block diagram of a switching regulator in accordance with a second practical embodiment of the present invention.
Figure 4:
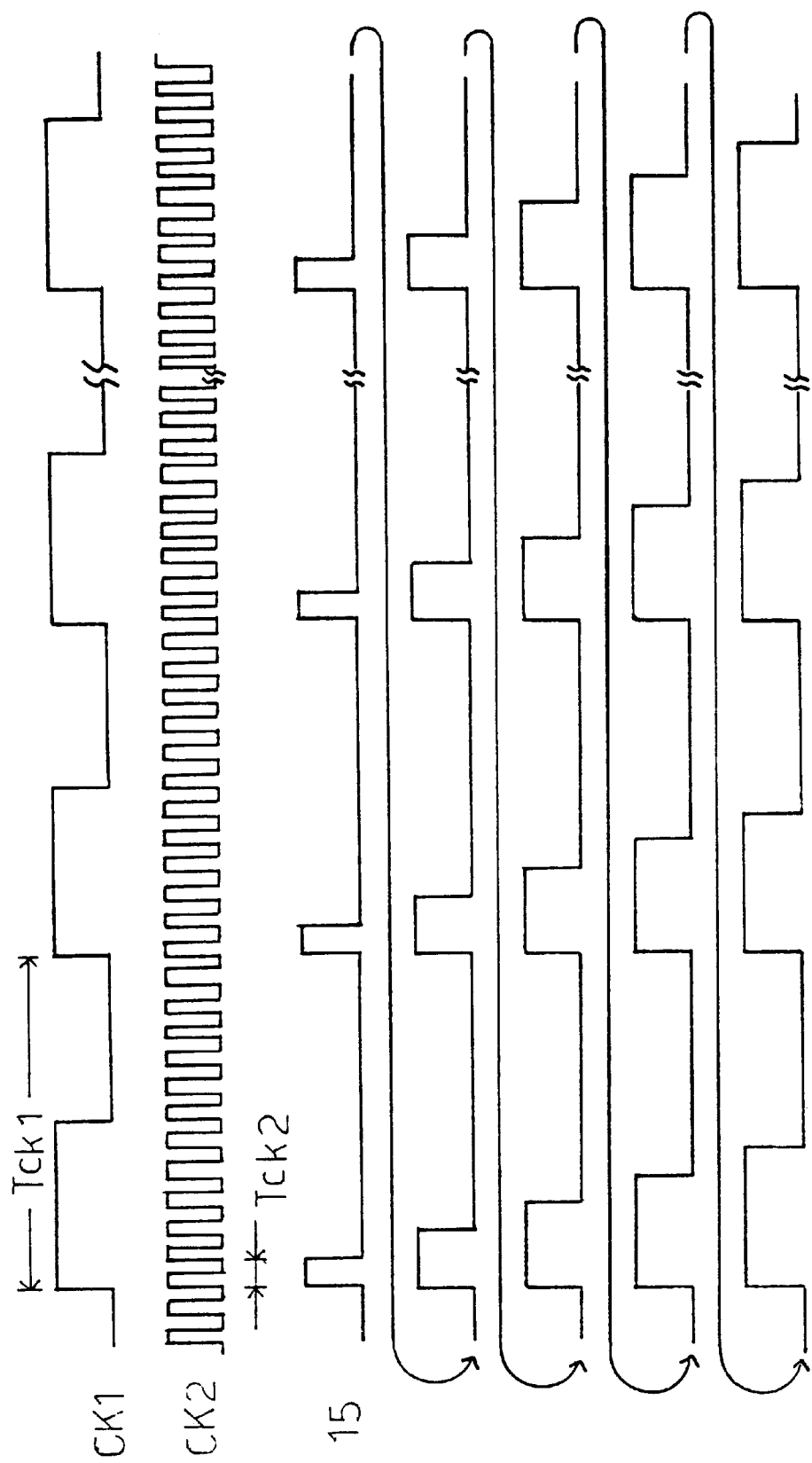
FIG. 4 is a time diagram used to show the operation of the switching regulator of FIG. 2.

FIG. 4 is a time diagram useful for exemplifying the operation of the switching regulator with the digital soft start-up circuit. The square-wave signal 15, having a period equal to the period $TCK_1$ of clock signal CK1, has a progressively increasing duty cycle: for a number of periods equal to n1, the duty cycle is equal to $T_{CK2}/T_{CK1}$, then for the following n1 periods the duty cycle is incremented to $2*T_{CK2}/T_{CK1}$, and so on up to the last n1 periods during which the duty cycle is set equal to $n2*T_{CK2}/T_{CK1}$ (where n2 is equal to five in the example,), A second practical embodiment of the present invention is shown in FIG. 5. Again, elements identical or equivalent to those shown in FIGS. 1 and 2 are identified by same reference numerals. For conciseness, a block 18 has been used to globally represent the external components of the switching regulator, that is, for example, the switching element 1, the first reactive element L, the diode D and the second reactive element C of FIGS. 1 and 2.

In this embodiment, the switching regulator comprises a counter 19, supplying a digital control logic 21 with a word 20. The control logic 21 supplies a word 22 to a digital-to-analog converter (DAC) 23. An output signal Vclamp of the DAC 23 is supplied to the operational amplifier 7 of the error amplifier 6. The counter 19 and the control logic 21 are supplied with a reset signal RST.

Signal Vclamp provides a clamping voltage for the error amplifier 6.

When the switching regulator is started, the reset signal RST is activated. Upon activation of signal RST, a start-up sequence begins. By putting a prescribed digitally coded value onto word 22, the control logic 21 sets the DAC 23 to an initial value Vclamp1, that is supplied as a clamping voltage to the error amplifier 6 through signal Vclamp. Such an initial value on signal Vclamp limits the value of the error signal 9, thus fixing an initial, low maximum duty cycle at which the switching regulator works.

At the same time the reset signal RST is activated, counter 19 starts to count. The counter continuously furnish the internal value thereof to the control logic 21, that monitors the reaching of an "end counting value". When such an "end counting value" is reached, control logic 21 updates the digitally coded value supplied to the DAC 23, so that a new value Vclamp2 is put on signal Vclamp. The new, updated value Vclamp2 fixes a new maximum duty cycle for the switching regulator, which is greater than the initial maximum duty cycle. The increase in the maximum duty cycle can for example be equal to the ratio between the maximum duty cycle allowed at the end of the start-up sequence, and the number of possible different voltage levels that the DAC 23 can provide at its output Vclamp.

Counter 19 again counts up to the "end counting value", and when such a value is reached control logic 21, through the DAC 23, updates the value on signal Vclamp so as to increase the maximum duty cycle by a same entity as before.

The sequence is iterated until the maximum duty cycle is reached.

In this second embodiment, differently from the previous one, the control loop of the switching regulator is always kept closed. In this way, it is avoided that the voltage at the output Vout of the switching regulator exceeds the desired, target value during the start-up phase.

Advantageously, for building the digital-to-analog converter 23 the same resistor strips used for generating the reference voltages for the triangular signal 11 can be used. This saves semiconductor area and obtains a high accuracy.

The disclosed embodiments of the present invention provide a switching regulator with a soft start-up capability, that is, with a duty cycle for the switching element which, during the initial transient after the regulator power-up is kept low so as to prevent excessive current from flowing through the switching element. This capability is achieved without however incurring in the drawbacks of the conventional structures. In particular, since the implementation of the soft start-up capability does not involve the generation of any ramp voltage, there is no need to integrate in the semiconductor chip large capacitors, or to provide dedicated pads in the semiconductor chip for the connection of external components.

The provision of a digital soft start circuit gives high flexibility to the switching regulator, so as to adapt to different conditions of use. For example, in the case of the first embodiment of the invention, the operation of the switching regulator in the start-up phase can be varied by simply varying the frequencies of the clock signals CK1, CK2, or varying the values n1, n2 carried by signals N1, N2, or both. In the case of the second described embodiment, the incremental steps of the duty cycle can be varied by varying the number of voltage levels that can be furnished by the DAC, while the time duration of each step can be varied by acting on the "end counting value".

While preferred embodiments of the invention have been illustrated and described, it is to be understood that various changes may be made therein that do not depart from the spirit of the invention. Thus, the invention is to be limited only by the scope of the claims that follow and the equivalents thereof.

What is claimed is:

1. A switching regulator, comprising: a switching element and a control loop for varying a duty cycle of the switching element according to a difference between a switching regulator output electric quantity and a target output electric quantity, and a digital soft start-up circuit for digitally controlling the duty cycle of the switching element, independently from said difference, in a start-up phase of the switching regulator operation, said control loop including an error amplifier for generating an error signal indicative of said difference between the switching regulator output electric quantity and the target output electric quantity, and an error-to-duty cycle converter circuit for generating a drive signal for the switching element, said drive signal having a variable duty cycle depending on the error signal.

2. The switching regulator of claim 1, comprising a multiplexer circuit for selectively supplying to the switching element either the drive signal or, during the start-up phase, a start-up drive signal generated by the digital soft start-up circuit.

3. The switching regulator of claim 2, wherein the multiplexer circuit is controlled by a start-up enable signal generated by the digital start-up circuit.

4. The switching regulator of claim 3, wherein the digital soft start-up circuit, at the beginning of the start-up phase, sets a duty cycle of the start-up drive signal to an initial low duty cycle value, lower than a duty cycle value that would correspond to said difference between the switching regulator output electric quantity and the target output electric quantity.

5. The switching regulator of claim 4, wherein during the start-up phase the digital soft start-up circuit sets the duty cycle of the start-up drive signal to progressively increasing duty cycle values from said initial low duty cycle value.

6. The switching regulator of claim 4, wherein the digital soft start-up circuit comprises a first clock signal having a first period and a second clock signal having a second period lower than the first period, the start-up drive signal having a period corresponding to the first period, the duty cycle of start-up drive signal increasing in discrete steps corresponding to the second period.

7. The switching regulator of claim 6, wherein the number of said discrete steps is a first programmable parameter of the digital soft start-up circuit.

8. The switching regulator of claim 7, wherein the digital soft start-up circuit, between successive increases of the start-up drive signal duty cycle, is configured to keep the duty cycle of the start-up signal constant for a number of periods determined by a second programmable parameter.

9. The switching regulator of claim 1, wherein the digital startup circuit comprises a digital-to-analog converter that supplies the error amplifier with a clamping voltage for clamping the error signal and consequently limiting the duty cycle of the drive signal.

10. The switching regulator of claim 9, wherein the value of the clamping voltage supplied by the digital soft start-up circuit to the error amplifier is made to vary during the start-up phase so as to progressively increase the duty cycle of the drive signal.

11. The switching regulator of claim 10, wherein the digital control circuit comprises a timing circuit, a control logic supplied by the timing circuit and a digital-to-analog converter controlled by the control logic for supplying the error amplifier with the clamping voltage whose value is progressively increased on a time basis furnished by the timing circuit.

12. The switching regulator of claim 11, wherein the timing circuit is a digital counter.

13. A switch element controlled circuit, comprising:
    a first conditioned incrementor having a clock input, an input for receiving first digital input signals, the first conditioned incrementor configured to generate a first periodic signal for a predetermined period of time upon activation;
    a second conditioned incrementor having a clock input, a first input for receiving the first digital input signals, a second input for receiving second digital input signals, and a third input for receiving the first periodic signal from the first conditioned incrementor, the second conditioned incrementor configured to generate a first control signal; and
    a control signal circuit having a first clock input and a second clock input configured to receive first and second clock input signals, respectively, a reset input for receiving a reset signal, the control signal circuit configured to generate a switch element control signal.

14. The switch element control circuit of claim 13, wherein the clock input of the first conditioned incrementor is coupled to a first clock signal source and the clock input of the second conditioned incrementor is coupled to the first clock signal source.

15. The circuit of claim 14, wherein the second conditioned incrementor is configured to generate the first control signal as a divided signal of the first periodic signal generated by the first conditioned incrementor.

16. The circuit of claim 15, wherein the first conditioned incrementor is configured to output a periodic signal that is augmented by a unity every period of the first clock signal for a predetermined number of periods and then returning to zero.

17. The circuit of claim 16, wherein the predetermined number of periods is determined by the first conditioned incrementor in response to the first digital input signals.

18. The circuit of claim 15, wherein the second conditioned incrementor is configured to generate the first control signal that is set to a numeric value of one upon activation of a reset signal and then to be augmented by a unity every period of the first clock signal for a predetermined period of time.

19. The circuit of claim 18, wherein the predetermined period of time of augmentation of the second conditioned incrementor is determined by the second conditioned incrementor in response to the second digital input signals.

* * * * *

UNITED STATES PATENT AND TRADEMARK OFFICE
CERTIFICATE OF CORRECTION

| | | |
|---|---|---|
| PATENT NO. | : 6,316,926 B1 | Page 1 of 1 |
| APPLICATION NO. | : 09/575334 | |
| DATED | : November 13, 2001 | |
| INVENTOR(S) | : Alessandro Savo et al. | |

It is certified that error appears in the above-identified patent and that said Letters Patent is hereby corrected as shown below:

In the Claims:

Column 8, Lines 2-3:
"digital control circuit comprises a timing circuit, a control logic supplied by the timing circuit and a digital-to-analog" should read, --digital startup circuit comprises a timing circuit, a control logic supplied by the timing circuit, and the digital-to-analog--.

Signed and Sealed this
Eighth Day of October, 2013

Teresa Stanek Rea
*Deputy Director of the United States Patent and Trademark Office*